United States Patent [19]
Ando

[11] Patent Number: 5,691,967
[45] Date of Patent: Nov. 25, 1997

[54] RECORDING OR REPRODUCING APPARATUS HAVING A SPINDLE SERVO CONTROL RUNAWAY PREVENT FEATURE

[75] Inventor: Ryo Ando, Tokyo, Japan

[73] Assignee: Sony Corporation, Tokyo, Japan

[21] Appl. No.: 528,353

[22] Filed: Sep. 14, 1995

[30] Foreign Application Priority Data

Sep. 20, 1994 [JP] Japan ................................. 6-250210
Sep. 20, 1994 [JP] Japan ................................. 6-250212

[51] Int. Cl.$^6$ .......................................................... G11B 7/00
[52] U.S. Cl. .......................................... 369/50; 369/47
[58] Field of Search .............................. 369/50, 47, 48, 369/51, 59, 44.13; 360/73.03

[56] References Cited

U.S. PATENT DOCUMENTS

| | | | |
|---|---|---|---|
| 4,901,300 | 2/1990 | Van Der Zande et al. | 369/47 |
| 5,065,384 | 11/1991 | Yokogawa | 369/74 |
| 5,093,820 | 3/1992 | Maeda et al. | 369/50 |
| 5,109,369 | 4/1992 | Maeda et al. | 369/50 |
| 5,163,035 | 11/1992 | Horikiri | 369/47 |
| 5,182,741 | 1/1993 | Maeda et al. | 369/50 |
| 5,185,732 | 2/1993 | Ogawa et al. | 369/47 |
| 5,315,571 | 5/1994 | Maeda et al. | 369/50 |
| 5,528,573 | 6/1996 | Shim | 369/50 |

Primary Examiner—Thang V. Tran
Attorney, Agent, or Firm—Limbach & Limbach L.L.P.

[57] ABSTRACT

A recording or reproducing device for a disc shape recording medium of the type having wobbled grooves includes a circuit for reproducing the recording medium, a circuit for extracting groove information, comparing the frequency of the groove information with a predetermined value, and determining from the comparison if the spindle servo is in a runaway state, and a control circuit which disables a PLL circuit in a spindle servo control if a runaway state is detected to thereby stop the runaway state.

3 Claims, 8 Drawing Sheets

RECORDING OR REPRODUCING APPARATUS HAVING A SPINDLE SERVO CONTROL RUNAWAY PREVENT FEATURE

BACKGROUND OF THE INVENTION

1. Field of the Invention

This invention relates to a recording or reproducing device for a disc-shaped recording medium such as a magneto-optic disc, for example, having recording tracks formed by wobbling grooves, and a clock reproducing device which is preferable for being installed in these devices.

2. Description of Related Art

In recent years, various kinds of digital data recording media have been made and it is well known in the art to provide an exclusive reproducing system using an optical disc such as a compact disc system, for example, or a Minidisc (trademark) system in which a user can record/reproduce audio data with the magneto-optic disc being applied as a recording medium.

In the magneto-optic disc used in the minidisc system, wobbling grooves 1a are formed on the disc 1 as shown in FIG. 9. Reference numerals 1b denote lands. The wobbling grooves 1a form so-called recording tracks and at the same time, the wobblings are formed by using a signal having absolute positional information on the disc modulated in FM so as to express the absolute positional addresses.

Then, in the case that the optical head radiates a laser beam SP on against a recording track, a push-pull signal of a detector for sensing the reflected light becomes information of wobbled grooves, and the groove information is decoded to enable the absolute positional address of the present scanning position of the optical head to be attained. In addition, the absolute positional address detected from the groove information defined as a groove address hereinafter, is recorded as data and distinguished from the address detected when the data is decoded.

In addition, in the case of the exclusive reproducing optical disc such as CD or a premastered type minidisc or the like, a clock for a CLV (constant linear velocity) servo of a spindle motor for rotating the disc is produced under application of a so-called EFM signal which is data read from the disc. In the case of a magneto-optic disc having some wobbling grooves 1a formed therein as shown in FIG. 9, the CLV servo is carried out under application of information detected from the wobbling grooves as described above. In other words, an FM demodulation is carried out from the groove information and a bi-phase decoding is performed to enable a groove address to be attained, although concurrently the groove information demodulated in FM is inputted into a PLL circuit so as to produce a clock of the groove address. In this way, the CLV servo information is produced by using the groove clock.

In the case that the CLV servo is carried out in reference to the groove information, there occur the following problems.

At first, in the case that the tracking servo is off during an access time, it is apparent that the groove information is not accurately detected. Normally, during an access time, although CLV is kept off, a disc rotational speed after access must be set to be fast in the case that an inner circumferential side of the disc is accessed, for example, so that there is a possibility that the CLV servo is turned on during access in order to make a fast rotational speed after access. In such a case as above, there is a problem that the spindle motor enters a runaway state due to the fact that the groove information is not accurately extracted.

In addition, it may occur that the groove information is disturbed and the spindle enters a runaway state not only in the case that the access is being performed but also when the tracking servo is removed.

In addition, in the case that the CLV servo is carried out in reference to the groove information, the system can not detect the number of rotations of the disc. Due to this fact, there is also a problem that a precise control may not be carried out in response to the number of rotations of the spindle when an operation for obtaining the desired object is performed. For example, in the case that a stopping operation such as a reproducing operation is carried out, a judgment up to what time a brake control against the rotation of the spindle should be performed and at what time the motor driving operation is turned off cannot be carried out accurately in response to the rotational speed of the spindle.

In addition, when a recording operation is carried out, the disc rotational speed must be stabilized at the predetermined linear velocity. If the recording is carried out before the spindle servo is stabilized, the data having a displaced linear velocity is recorded and an inferior data reading-out operation is carried out during the reproducing operation.

In the case that the CLV servo is being carried out in reference to the groove information, the system cannot detect the number of rotations of the disc, resulting in that the timing of starting the recording operation cannot be judged accurately. Due to this fact, there occurs a possibility that the recording is started before the CLV control is stabilized just after the CLV servo is turned on such as after a track jump is carried out. In addition, if a phase information to be inputted to the PLL circuit is disturbed due to an influence of a scar on the disc or a presence of obstacles at the groove addresses demodulated in FM, the groove clock is disturbed and so in such a case as above, if the clock reproducing operation is carried out as it is, there may occur an inputting error of groove addresses or a disturbance in the number of rotations of the disc. However, in the prior art, there was no means for performing a positive sensing of the state of the groove clock and also there was a problem that an operating error caused under an influence of scar on the disc could not be effectively prevented.

SUMMARY OF THE INVENTION

The present invention has been completed in view of the aforesaid problem and it is an object of the present invention to enable information of the number of rotations of the spindle to be attained when the CLV servo is performed with the groove information, thereby enabling a positive spindle servo control or control over a recording operation to be carried out.

This object is achieved by the present invention of a recording or reproducing apparatus for recording or reproducing data to a disc shaped recording medium or from the disc shaped recording medium on which recording tracks are formed by grooves wobbled with respect to a track center-line in response to absolute position information and comprises reproducing means for reproducing data from the disc shaped recording medium, groove information extracting means for extracting groove information from the reproduced data from the reproducing means, frequency measuring means for measuring a frequency of the extracted groove information from the groove information extracting means, demodulating means for demodulating the absolute position information and address clock information in accordance with the extracted groove information from the groove information extracting means, rotational servo means for rotating the disc shaped recording medium at a predetermined velocity in accordance with at least one of the extracted groove information and the address clock information, discriminating means for discriminating whether the rotating speed is in a runaway state or not in accordance with the result of the measurement performed by the frequency measuring means, and control means for generating a command signal to the rotational servo means to decelerate a rotating speed of the disc shaped recording medium if the rotating speed is in a runaway state in accordance with the result of the discriminating means.

Further included are operating means for operating a stop motion of the disc shaped recording medium, second discriminating means for discriminating whether the rotating speed is lower than a predetermined speed or not in accordance with the result of measurement performed by the frequency measuring means, and wherein the control means generates a command signal so as to stop the rotating operation, if the rotating speed is lower than the predetermined speed in accordance with the result of the second discriminating means.

The foregoing and other objectives, features and advantages of the invention will be more readily understood upon consideration of the following detailed description of certain preferred embodiments of the invention, taken in conjunction with the accompanying drawings.

DESCRIPTION OF THE PREFERRED EMBODIMENT

The recording and reproducing device of the preferred embodiment of the present invention will be described.

Figure 2:
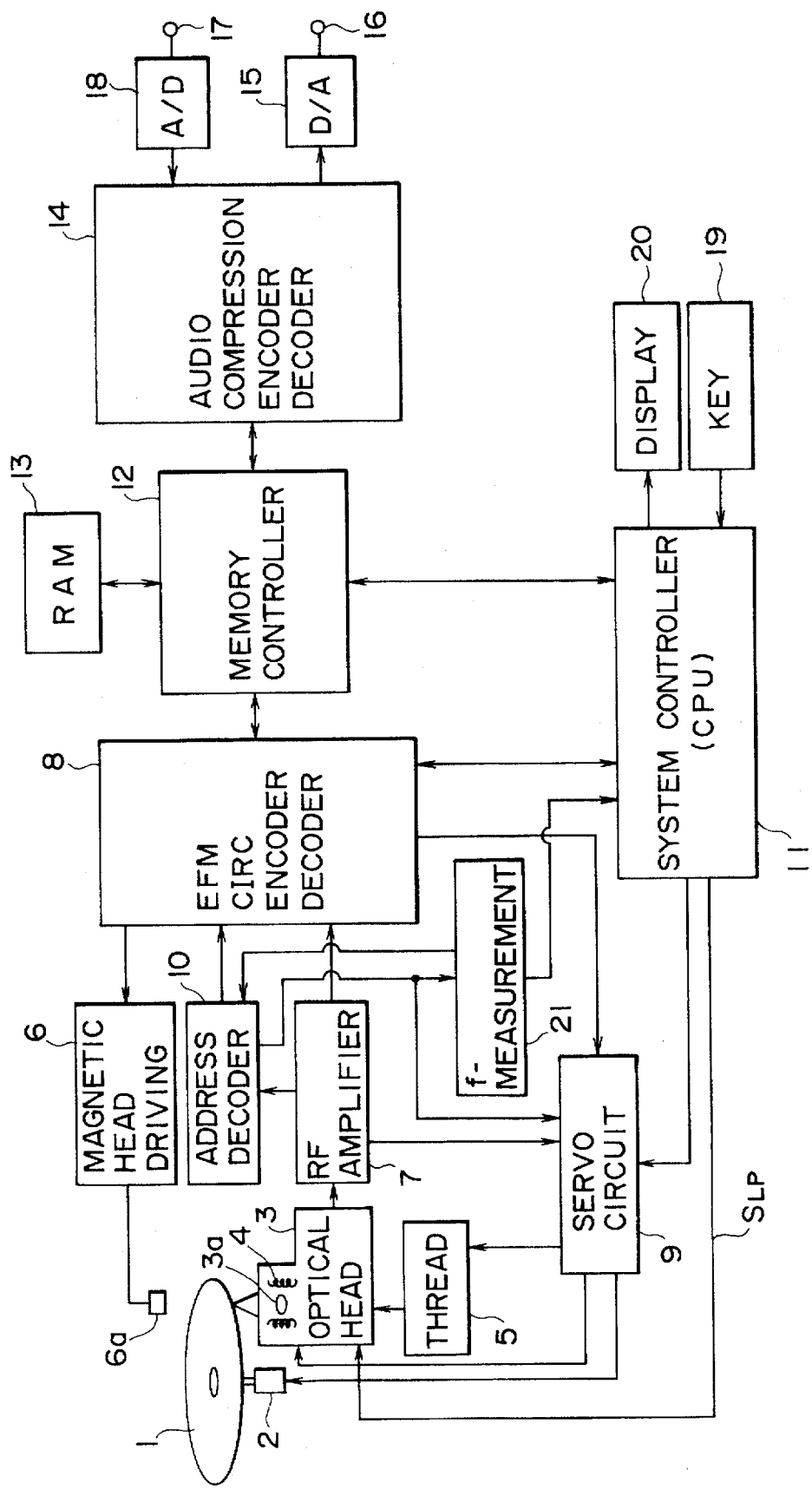
FIG. 2 is a block diagram for showing a recording and reproducing device of the preferred embodiment of the present invention.

FIG. 2 is a block diagram for showing the recording and reproducing device (a Minidisc recording and reproducing device) of the preferred embodiment.

In FIG. 2, reference numeral 1 denotes a magneto-optic disc, the disc 1 is rotationally driven by a spindle motor 2. Reference numeral 3 denotes an optical head for radiating a laser beam on the disc 1 during a recording/reproducing operation. During recording operation on the magneto-optic disc, the optical head outputs a laser having a high level for heating the recording track up to a Curie temperature and in turn, during a reproducing operation, it performs a laser outputting of relative low level for detecting data obtained from the reflection beam under the Kerr rotation magnetic effect.

In order to perform a data reading-out operation from the disc 1, the optical head 3 has an optical system comprised of a laser diode acting as a laser output means or a deflecting beam splitter or an object lens or the like and a detector for use in detecting a reflection light. The object lens 3a is held by a two-axis mechanism 4 in such a way that it may be displaced in a radial direction of the disc and a direction moving toward or away from the disc, and the entire optical head 3 can be moved by a thread mechanism 5 in a radial direction of the disc.

Figure 3:
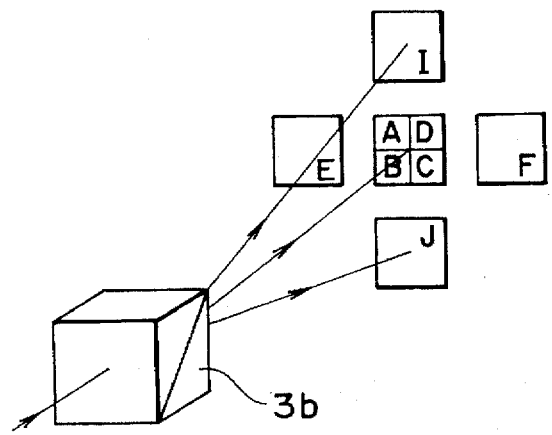
FIG. 3 is an illustration for showing a detector in an optical head of the preferred embodiment.

As the detector for use in sensing the reflection light, as shown in FIG. 3, the four-divided detectors (A, B, C, D), side-spot detectors (E, F) and RF sensing detectors (I, J) are mounted. A reflection light radiated from the disc 1 is radiated against these detectors through a Wollaston polarizing prism 3b.

In addition, reference numeral 6a denotes a magnetic head for applying a magnetic field modulated in reference to supplied data to the magneto-optic disc and this magnetic head is placed at a position opposing against the optical head 3 while holding the disc 1 thereat. The magnetic head 6a is moved by the thread mechanism 5 together with the optical head 3 in a radial direction of the disc.

Figure 9:
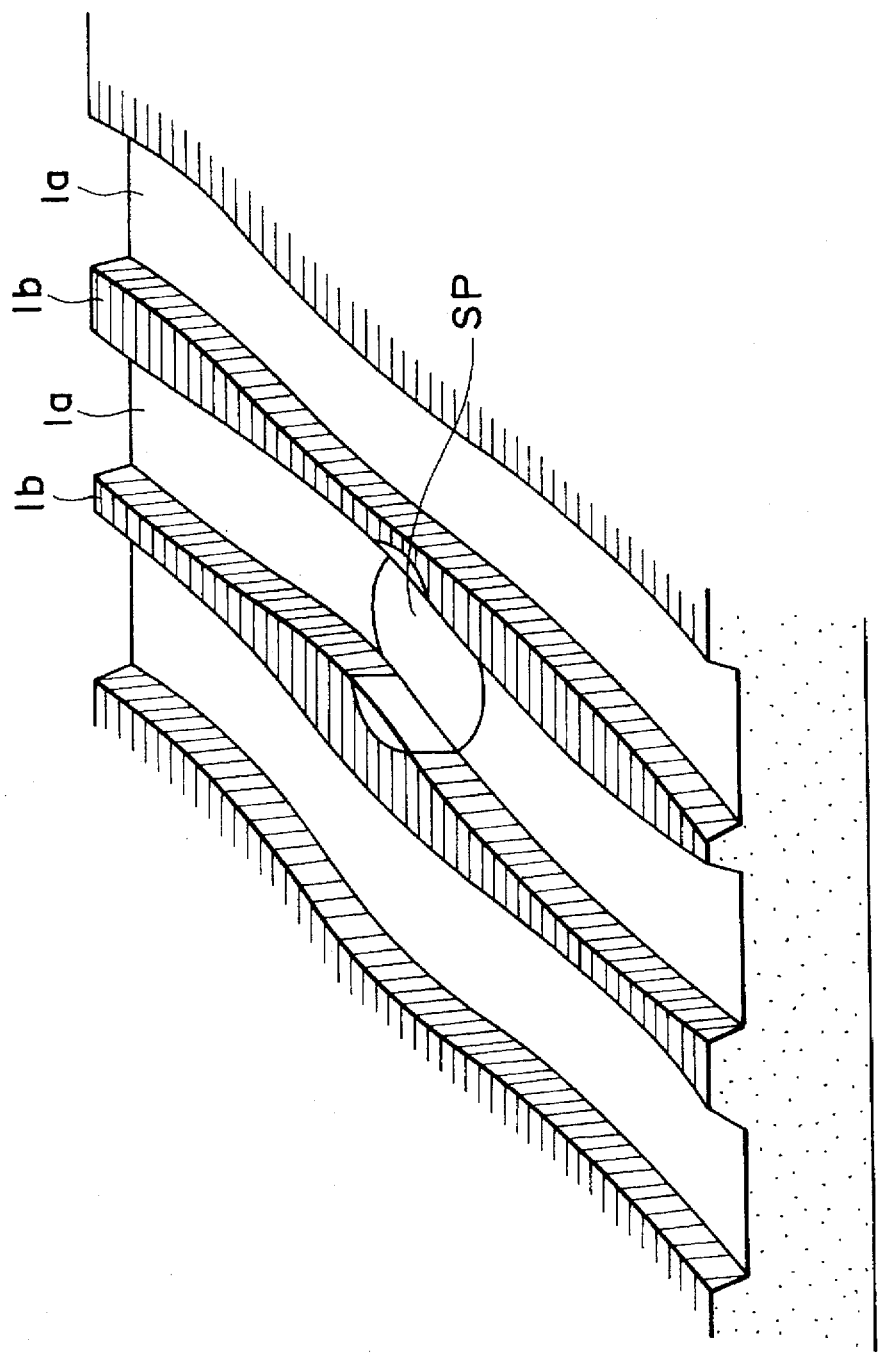
FIG. 9 is an illustration for showing a wobbling groove in a Minidisc.

Information detected by the optical head 3 from the disc 1, i.e. outputs from the detectors A, B, C, D, E, F, I and J under a reproducing operation are supplied to an RF amplifier 7. The RF amplifier 7 extracts a reproduced RF signal, a tracking error signal, a focus error signal, a groove information (information of the wobbling groove on the magneto-optic disc 1 as shown in FIG. 9) under a calculating operation for the supplied information. Then, the extracted reproduced RF signal is supplied to an encoder/decoder part 8. In addition, the tracking error signal and the focus error signal are supplied to a servo circuit 9.

At the RF amplifier 7, as the RF signal, outputs of the detectors (I, J) are used and produced. That is, the data stored on the magneto-optic disc are extracted under a processing of I–J. In addition, pit data on the magneto-optic disc or data in the case that the disc 1 is a premastered optical disc is extracted under the processing of I+J.

In addition, the focus error signal is produced under an operation in which a calculation of (A+C)–(B+D) for the outputs of the four-divided detectors (A, B, C, D) is carried out.

As the tracking error signal, outputs from the detectors (E, F) are used and produced under a calculation of E–F.

In addition, a push-pull signal of (A+D)–(B+C) is supplied to an address decoder 10 as a groove information.

The servo circuit 9 generates various servo driving signals through a supplied tracking error signal, a focus error signal or a tracking jump instruction and a seek instruction obtained from a system controller 11, controls the two-axis mechanism 4 and the thread mechanism 5 and performs a focus and tracking control.

As described later, the spindle motor 2 is controlled to have a constant linear velocity (CLV) under application of the groove information and the clock of the groove address decoded in reference to the groove information. In addition, driving and stopping of the spindle motor 2 are controlled by control signals such as a spindle kick or a spindle brake and the like obtained from the system controller 11.

The reproduced RF signal is demodulated in EFM at the encoder/decoder 8 and decoded in CIRC or the like and once written into a buffer RAM 13 by a memory controller 12. Reading of data from the magneto-optic disc 1 through the optical head 3 and the transfer of the reproduced data from the optical head to the buffer RAM 13 is carried out at a rate of 1.41 Mb/s (intermittently).

Data written into the buffer RAM 13 is read out at a timing of transfer of reproduced data of 0.3 Mb/s and supplied to the encoder/decoder 14. Then, a reproducing signal processing such as a decode processing against an audio compression processing is carried out, it is changed into an analog signal by a D/A converter 15, supplied from a terminal 16 to a desired amplifier circuit, reproduced and outputted. For example, the analog signals outputted as L and R audio signals.

Because the data read out of the disc 1 is written into the buffer RAM 13 intermittently at a high speed rate, read out at a slower speed rate and outputted in audio form, a so-called shock-proof function can be realized in which even if the tracking servo is temporarily released, for example, so that the data reading-out of the disc 1 cannot be carried out, the audio output is continued without being interrupted.

The address decoder 10 performs a demodulation in FM and a hi-phase decoding of the groove information supplied from the RF amplifier 7 so as to output a groove address. This groove address or address information decoded by the encoder/decoder part 8 is supplied to the system controller 11 through the encoder/decoder part 8 and applied for various controlling operations.

In the case that a recording operation is carried out in respect to the disc (a magneto-optic disc) 1, the recording signal (an analog audio signal) supplied to the terminal 17 is changed into digital data through the A/D convertor 18, thereafter supplied to the encoder/decoder 14 and an audio compression encoding processing is performed. The recording data compressed by the encoder/decoder 14 is once written into the buffer RAM 13 by the memory controller 12, read out at a predetermined timing and sent to the encoder/decoder 8. Then, a CIRC encoding and an encoding of EFM in modulation are processed at the encoder/decoder 8, thereafter, they are supplied to the magnetic head driving circuit 6. That is, a magnetic field of either N or S is applied to the magneto-optic disc 1 through the magnetic head 6a. At this time, the system controller 11 supplies a control signal S LP to the optical head 3 in such a way that a laser beam of the recording level is outputted.

The system controller 11 is comprised of a microcomputer which controls an operation of each of the components as described above in accordance with a user's operation or an internal stored program.

Reference numeral 19 denotes an operation inputting part provided with some keys applied for user's operation and reference numeral 20 denotes a displaying part composed of a liquid crystal display, for example.

Reference numeral 21 denotes a frequency measuring part 21. This frequency measuring part is constructed such that it measures the frequency concerning the groove information and it can supply the data of the result of the measurement to the system controller 11.

The spindle servo system in the recording and reproducing device as described above is constructed as shown in FIG. 1.

As described above, the groove information is outputted from the RF amplifier 7 as the push-pull signal. This push-pull signal is supplied at first to the bandpass filter 10a in the address decoder 10 and its range is limited, thereby the groove information ADFG having a noise component eliminated is obtained.

The groove information ADFG having its range limited by the bandpass filter 10a is demodulated by an FM demodulation part 10b and outputted as the address data FMDT through a processing of a bi-phase decoder 10c.

The output of the FM demodulation part 10b is outputted as the address clock (groove clock) FMCK through a processing of a clock recovery part 10d. The details of the clock recovery 10d will be described later.

This address data FMDT and the address clock FMCK are supplied to the address decoder 8a at the encoder/decoder 8. The address decoder 8a decodes the address data FMDT at a decode timing with the address clock FMCK so as to obtain the groove address. This groove address is supplied to the system controller 11 and then the system controller 11 can acknowledge the present scanning position with the optical head 3.

In turn, the groove information ADFG which is an output of the band-pass filter 10a and the address clock FMCK are supplied to the CLV servo system 9a at the servo circuit 9 and used in a spindle servo control.

In the case that a rough servo is carried out when a spindle raising is performed at first, the CLV servo part 9a performs a spindle rotational control by using the groove information ADFG. Then, after changing-over from the rough servo to the normal servo, the address clock FMCK is used. That is, the address clock FMCK is compared with a reference clock to generate a spindle error signal and an application of electrical power from the motor driver 9b to the spindle motor 2 is performed in response to the spindle error signal.

In addition, the spindle starting instruction and the stopping instruction or the like are supplied from the system controller 11 to the CLV servo circuit 9a.

Although there is provided the frequency measuring part 21 in the preferred embodiment as described above, the groove information ADFG is supplied to the frequency measuring part 21 and then the frequency about the groove information ADFG can be measured.

Then, a speed OK signal, a fast signal FST and a slow signal SLW to be described later as the spindle rotational speed information Iv are generated in response to the result of measurement and they are supplied to the system controller 11. In addition, the fast signal FST and the slow signal SLW are also supplied to a NOR circuit 35 in the clock recovery part 10d. The frequency measuring part 21 may output the spindle rotational speed information Iv as follows.

At first, in the case that the measured frequency is within ±4% in reference to a frequency of the groove information ADFG under a rated linear velocity, the frequency measuring part 21 may output the speed OK signal indicating that the rotational speed of the spindle motor 2 is kept at a stable state.

In turn, in the case that the measured frequency is more than two times of the reference frequency, the rotational speed of the spindle motor 2 is kept at a substantial high speed, i.e. this shows that the motor is in its runaway state. Thus, in such a case as above, it outputs the fast signal FST indicating the runaway state of the spindle.

To the contrary, an occasion in which the measured frequency is less than ⅓ of the reference frequency corresponds to the case in which the rotational speed of the spindle motor 2 is at a substantial low speed. In view of this fact, under this condition, it may output the slow signal SLW indicating the spindle low speed state.

The system controller 11 enables various positive controls to be carried out in response to the spindle rotational speed information Iv obtained from such a frequency measuring part 21.

Three examples of control operation of the system controller 11 which can be realized in the present preferred embodiment will be described as follows.

Figure 4:
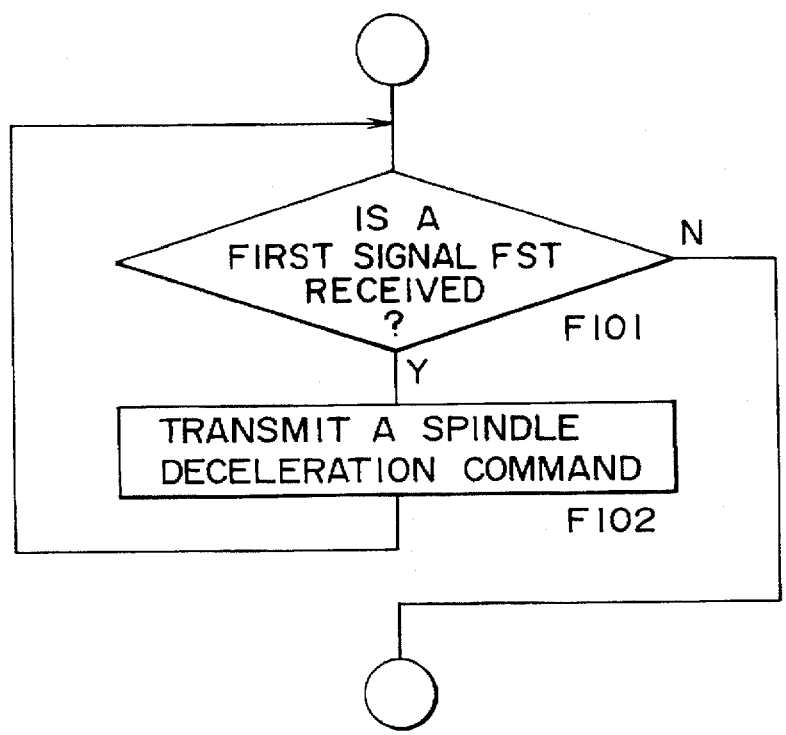
FIG. 4 is a flow chart for showing an example of controlling operation in the preferred embodiment.

At first, the processing shown in FIG. 4 corresponds to the case in which the system controller 11 receives the first signal FST obtained from the frequency measuring part 21. Since the system controller 11 can acknowledge a runaway state of the spindle in reference to the first signal FST, it transmits the spindle deceleration command (a spindle brake signal) to the CLV servo part 9a (F101 to F102).

With such an arrangement as above, even if the spindle motor 2 runs away due to a certain reason, it becomes possible to control deceleration instantly and to recover it to its regulated state.

Figure 5:
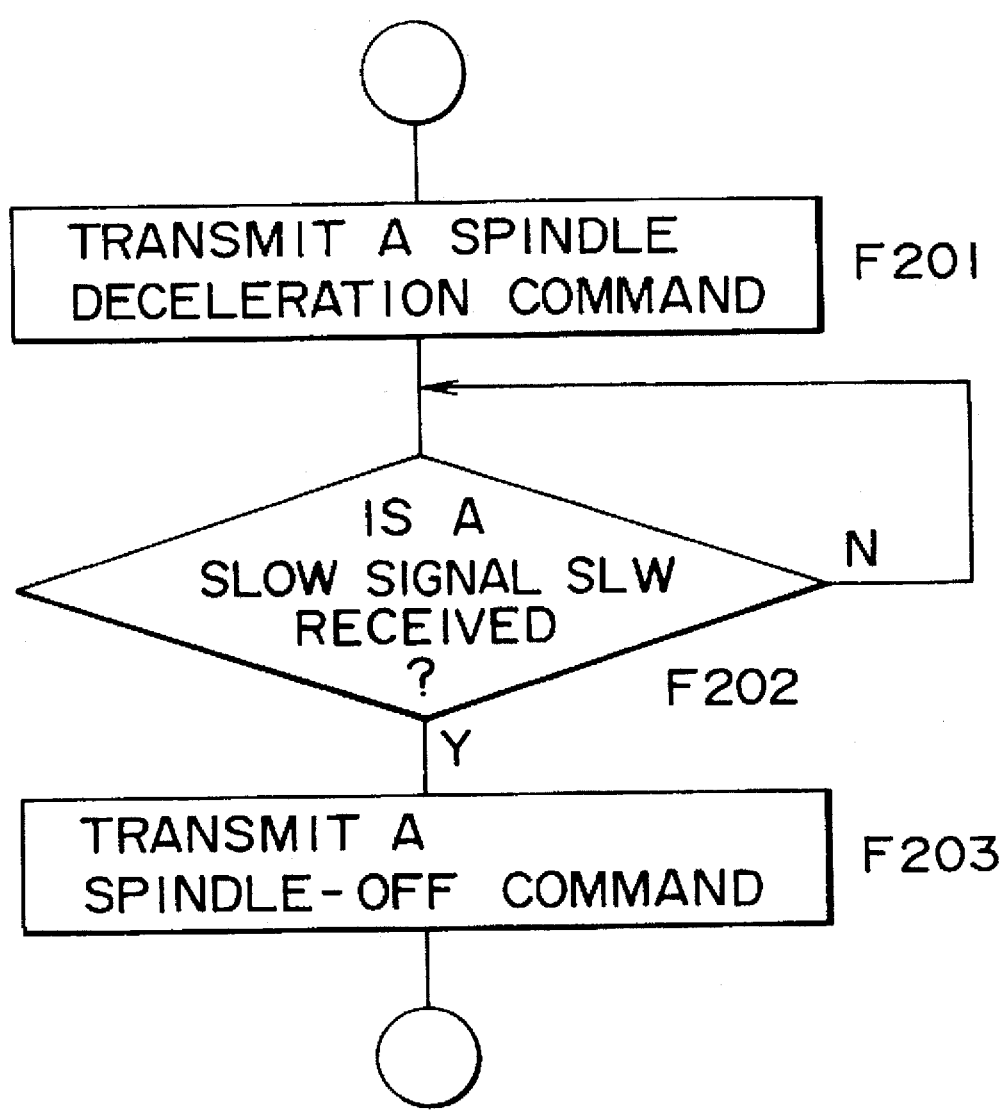
FIG. 5 is a flow chart for showing an example of controlling operation in the preferred embodiment.

Then, the processing shown in FIG. 5 corresponds to the case in which a user performs a stopping operation. The system controller 11 transmits the spindle brake signal to the CLV servo part 9a in response to a stopping operation performed at the operating part 19, resulting in that the spindle motor 2 is controlled in its deceleration state (F201). In this case, the slow signal SLW produced from the frequency measuring part 21 is waited (F202) and upon receiving the slow signal SLW, the driving of the spindle motor is turned off (F203).

In other words, it is possible to obtain the most suitable timing in which the driving of the spindle motor is turned off with the slow signal SLW, resulting in that an efficient stopping control can be performed.

Figure 6:
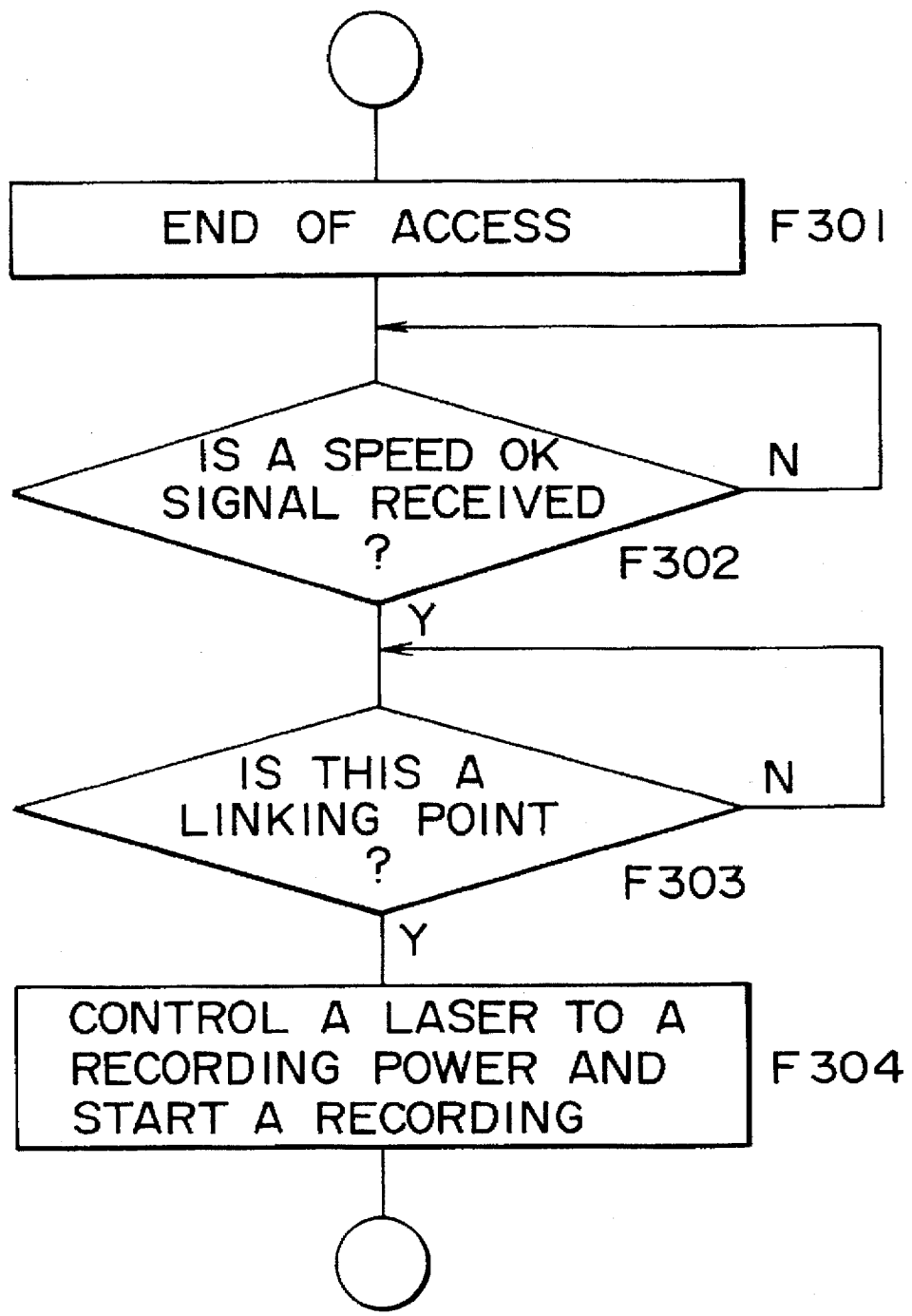
FIG. 6 is a flow chart for showing an example of controlling operation in the preferred embodiment.

Processing shown in FIG. 6 corresponds to the case in which an access is carried out during recording of data into the disc 1. During recording operation, data is recorded in sequence in a free area (not yet recording area) on the disc and for example, in the case that the free area is separately present on the disc, the recording is carried out in a certain free area and then other free areas are accessed to continue the recording operation.

In the case that such an access is carried out (F301), each servo is turned on after completion of the access, the spindle setting and a focus/tracking setting are performed, although if the recording is started before setting of the spindle, data having a linear velocity displaced is recorded.

In view of this fact, in the example of this processing, the system controller 11 waits for the speed OK signal from the frequency measuring part 21 after completion of the access (F302).

Then, the speed OK signal is received and after confirmation of the spindle setting completion, a linking point is detected and a recording operation is started (F303, F304). That is, the laser power is applied as a recording level.

Figure 7:
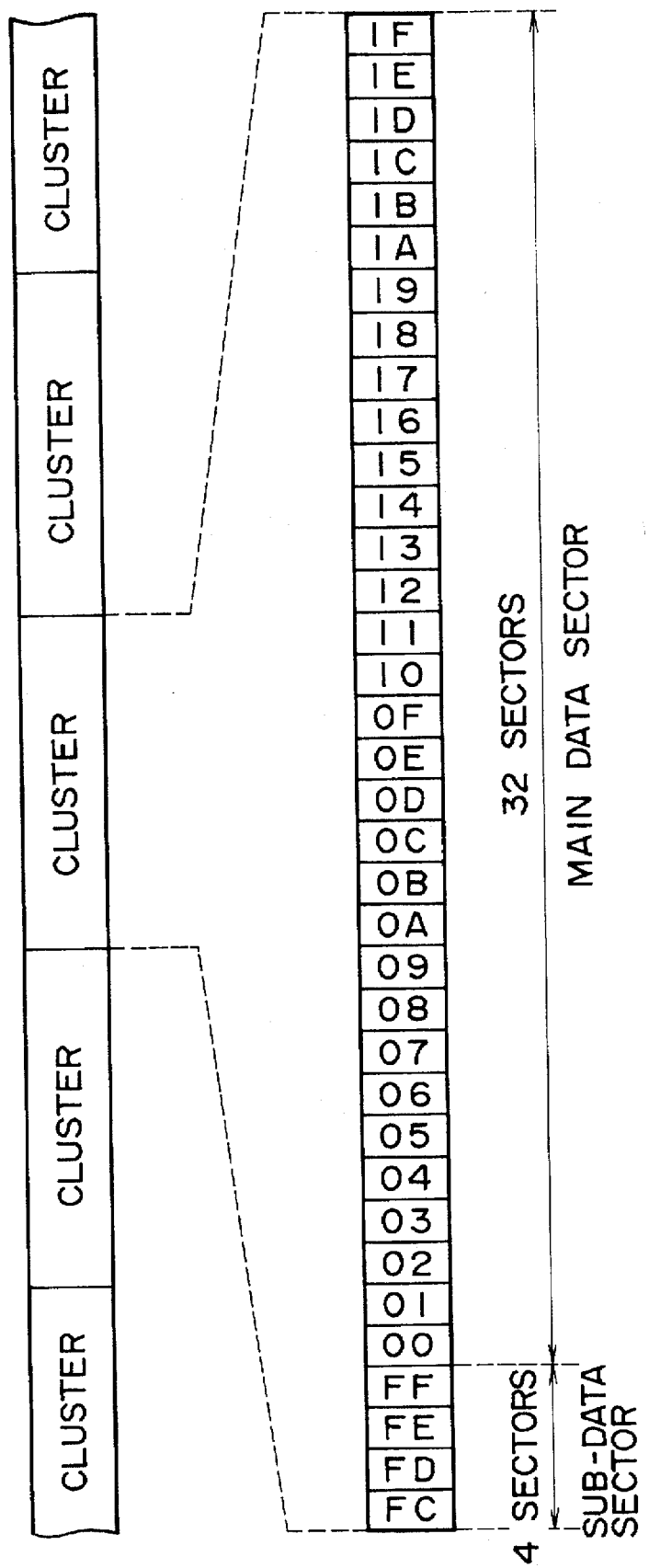
FIG. 7 is an illustration for showing a sector structure of a minidisc.

In addition, the linking point becomes a recording starting point. In the Minidisc, the data recorded as shown in FIG. 7 is divided into some clusters in its unit and this cluster becomes a minimum unit during a recording operation.

One cluster is comprised of 36 sectors. 32 sectors ranging from "00" to "1F" are defined as a main data sector, and the actual audio data or monitoring information or the like is recorded in this sector. 4 sectors of remained "FC" to "FF" are defined as a sub-data sector, although actually this sub-data sector is defined as the linking area with the dummy data.

A recording operation in a cluster unit is started from the central position of the sector FD in the linking area and the data is recorded in sequence in 32 sectors ranging from "00" to "1F".

That is, the processing shown in FIG. 6 is carried out such that after setting of the spindle, the sector addresses are monitored and the recording operation is started at the time the sector becomes the sector FD. Confirmation of setting of the spindle with the processing of the step F302 shown in FIG. 6 eliminates the possibility that the data having displaced linear velocity is recorded.

The processing after access between the recording areas is carried out has been described, although it is of course apparent that this processing can be applied as a processing at the starting time of recording operation (that is, after access to the initial free area).

Three kinds of operating controls have been described as above, although the system controller 11 can perform various positive controls other than those in response to the spindle rotational speed information Iv obtained from the frequency measuring part 21 or in response to both spindle rotational speed information Iv and a user's operating object.

For example, it is possible to get positively a timing for changing from the rough servo to the normal servo when the spindle is started to operate.

In addition, in the case that the speed OK signal is already confirmed during recording operation and the spindle motor rotational speed becomes unstable due to a certain reason not to enable the speed OK signal to be obtained, it becomes possible that the recording operation is temporarily interrupted and the controlling operation to stabilize the spindle also becomes possible. This is similarly applied during the recording operation.

Figure 1:
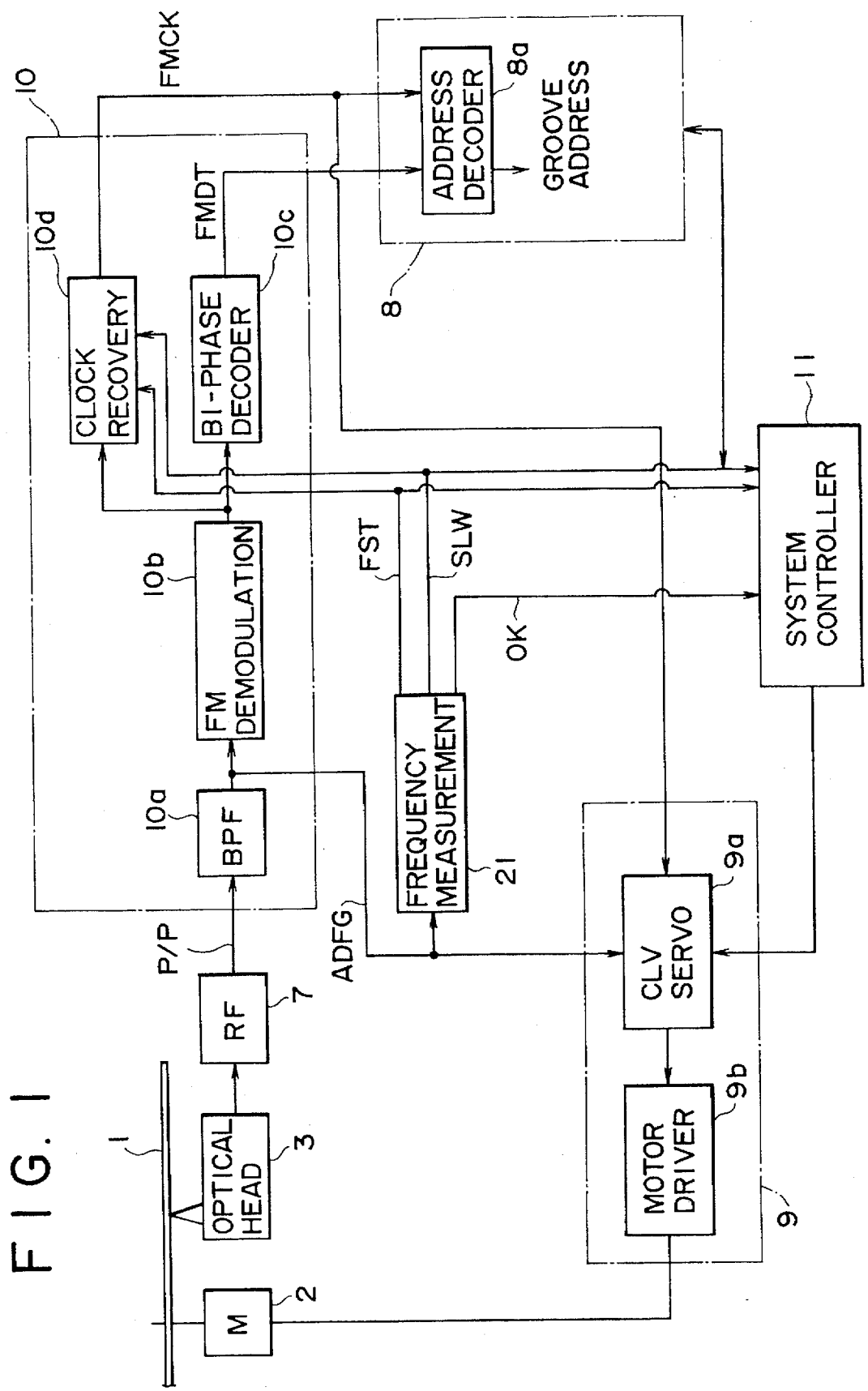
FIG. 1 is a block diagram for showing a CLV servo system of a recording and reproducing device of the preferred embodiment of the present invention.

Then, referring now to FIG. 8, the clock reproducing device of the preferred embodiment will be described. Description of its configuration also shown in FIG. 1 is eliminated for a sake of easiness in understanding of the embodiment and only the clock recovery part 10d which is a substantial part of the embodiment will be described.

An output of the FM demodulation part 10b is detected at its edge by the edge sensing part 33 and supplied to a phase comparator 36 through AND circuit 34.

The PLL circuit is comprised of the phase comparator 36, a low-pass filter 37 and a voltage controlling oscillator (VCO) 38. At the phase comparator 36, the phase information obtained from the edge sensing part 33 is compared with the phase of a VCO oscillating output of the VCO 38 and then a voltage corresponding to the phase difference is outputted. This voltage output is supplied to the VCO 38 through the low-pass filter 37 acting as a loop filter. The VCO 38 controls an oscillating frequency in response to the inputted voltage and outputs it. The output from the VCO 38 becomes the address clock FMCK. When either the fast signal FST or the slow signal SLW is outputted from the frequency measuring part 21, an output of NOR circuit 35 becomes "L" level. In this case, AND circuit 34 does not supply any output from the edge sensing part 33 to the phase comparator 36.

In other words, in the case that the frequency measured by the frequency measuring part 21 becomes higher or lower than a reference frequency by a certain predetermined value, the phase comparing operation in the PLL circuit is interrupted and VCO 38 continues to output oscillation under a free run state. That is, in this case, a substantial disturbance of the address clock FMCK caused under an influence of irregular groove information or scar on the disc is prevented in advance, thereby an inputting operation of the groove address or disturbance of CLV servo may not be performed.

When the frequency measured by the frequency measuring part 21 returns to its normal state and an output of either the fast signal FST or the slow signal SLW is stopped, an output of the NOR circuit becomes an "H" level, an output from the edge sensing part 33 is supplied again to the phase comparator 36 through the AND circuit 34, the normal PLL operation is started to operate again and the address clock FMCK is outputted.

As described above, the clock reproducing device of the preferred embodiment of the present invention can prevent the reproduced address clock from being disturbed due to the fact that the PLL operation is controlled in response to information obtained from the frequency measuring part 21.

Figure 8:
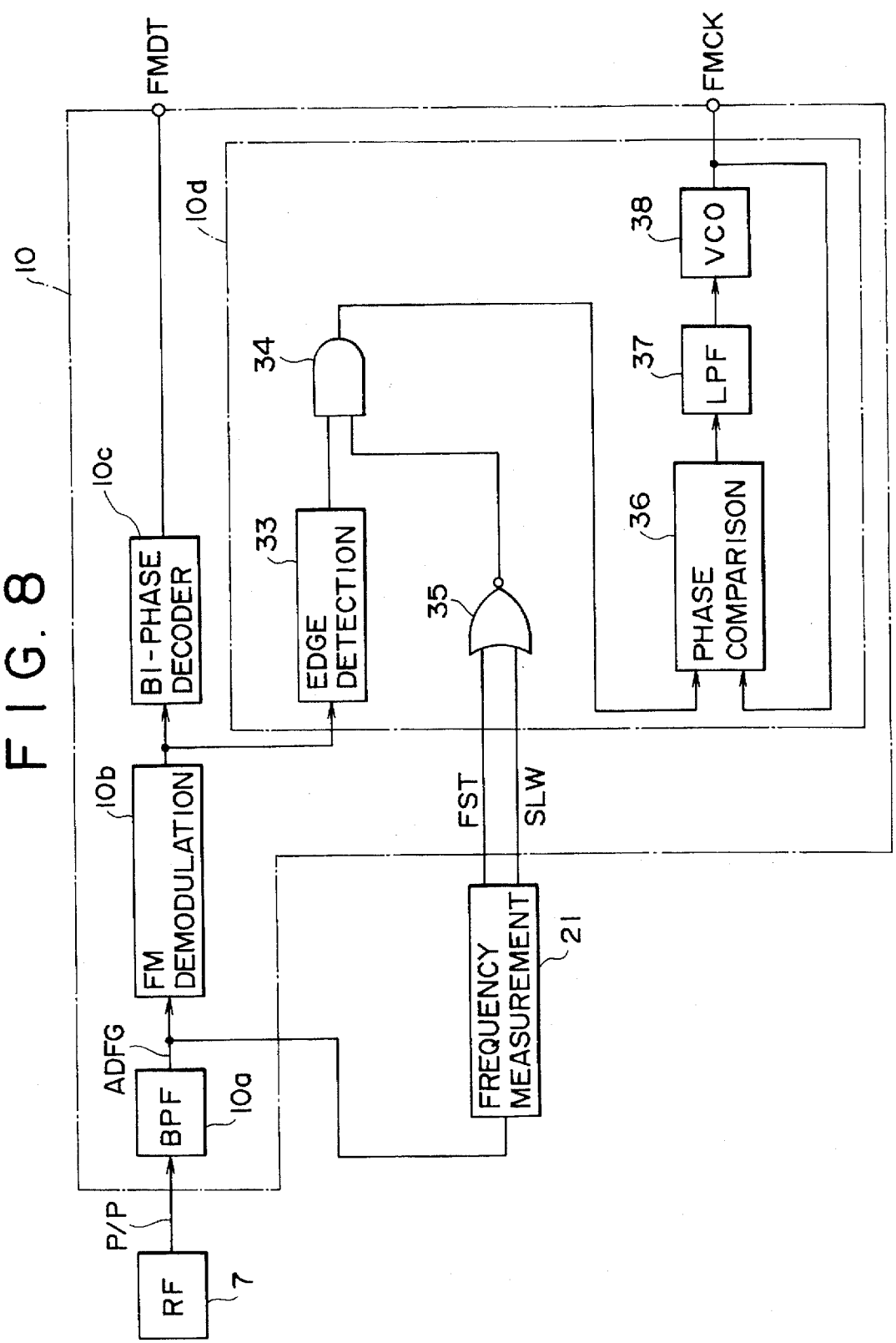
FIG. 8 is a block diagram for showing a clock reproducing device in the preferred embodiment.

It may also be devised to provide a configuration of the clock reproducing device other than those illustrated in FIG. 8. For example, in the case that either the fast signal FST or the slow signal SLW is outputted, the phase comparison is not interrupted, but a specified stable phase signal may be fed into the phase comparator 36 in place of the phase information obtained from the edge sensing part 33.

As described above, the present invention has an effect that the spindle operation control can be performed more positively in response to the result of measurement of frequency, and occasionally in response to both frequency measuring result and a content of operation performed by a user due to the fact that the spindle rotational speed can be discriminated by obtaining the frequency information about the groove information. For example, it becomes possible to perform a rapid stopping of the runaway state of the spindle or an efficient stopping of it within a short period of time when the rotational stopping is carried out.

Similarly, the present invention has an effect that a recording timing can be controlled in response to the state of spindle rotational speed, thereby the spindle can be controlled in such a way that the recording operation is carried out at a correct linear velocity state.

In addition, the present invention can estimate an occurrence of disturbance of clock reproducing operation about the groove information, and in such a case as above, it has an effect that the disturbance of reproducing clock can be prevented through processing such as an interruption of the phase comparison. With such an arrangement as above, the recording and reproducing device having this clock reproducing device mounted thereon can prevent disturbance of the CLV servo and the like.

What is claimed is:

1. A recording or reproducing device for a disc-like recording medium having some recording tracks formed by grooves wobbled in response to their absolute positional information comprising:

information reading means for reading information, including groove information, from the disc-like recording medium;

frequency information extracting means for extracting groove frequency information from information extracted by said information reading means;

frequency measuring means for measuring a frequency of the frequency information extracted by said frequency information extracting means and generating a runaway state detection signal if the measured frequency exceeds a predetermined frequency;

clock generating means, including a phase locked loop (PLL) circuit, supplied with the groove frequency information from the frequency information extracting means for generating a clock;

rotational servo means for controlling a rotational speed of the disc-like recording medium; and control means for controlling an operation of said rotational servo means in response to the clock and the runaway state detection signal and wherein the control means interrupts a phase lock operation of the PLL circuit in response to the runaway state detection signal.

2. A recording or reproducing apparatus for recording or reproducing data to a disc shaped recording medium or from the disc shaped recording medium on which recording tracks are formed by grooves wobbled with respect to a track centerline in response to absolute position information comprising:

reproducing means for reproducing data from the disc shaped recording medium;

groove information extracting means for extracting groove information from the reproduced data from the reproducing means;

frequency measuring means for measuring a frequency of the extracted groove information from the groove information extracting means;

demodulating means for demodulating the absolute position information and address clock information in accordance with the extracted groove information from the groove information extracting means;

rotational servo means for rotating the disc shaped recording medium at predetermined velocity in accordance with at least one of the extracted groove information and the address clock information;

discriminating means for discriminating whether the rotating speed is in a runaway state or not in accordance with the result of the measurement performed by the frequency measuring means; and control means for generating a command signal to the rotational servo means to decelerate a rotating speed of the disc shaped recording medium if the rotating speed is in a runaway state in accordance with the result of the discriminating means.

3. A recording and/or reproducing apparatus of claim 2, further comprising operating means for operating a stop motion of the disc shaped recording medium;

second discriminating means for discriminating whether the rotating speed is lower than predetermined speed or not in accordance with the result of measurement performed by the frequency measuring means; and wherein the control means generates a command signal so as to stop the rotating operation, if the rotating speed is lower than predetermined speed in accordance with the result of the second discriminating means.

* * * * *